(12) United States Patent
Boutaghou

(10) Patent No.: US 6,215,628 B1
(45) Date of Patent: Apr. 10, 2001

(54) INTERTIAL LATCHING SYSTEM FOR A DISC DRIVE ACTUATOR

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/272,805

(22) Filed: Mar. 19, 1999

Related U.S. Application Data
(60) Provisional application No. 60/078,879, filed on Mar. 20, 1998.

(51) Int. Cl.$^7$ .............................. G11B 5/54; G11B 21/22
(52) U.S. Cl. ........................................... 360/256.4
(58) Field of Search ........................................... 360/256.4

(56) References Cited

U.S. PATENT DOCUMENTS

| | | | |
|---|---|---|---|
| 5,296,986 | * | 3/1994 | Morehouse et al. ................. 360/106 |
| 5,448,436 | * | 9/1995 | Albrecht .............................. 360/105 |
| 5,555,146 | * | 9/1996 | Hickox et al. ....................... 360/105 |
| 5,636,090 | * | 6/1997 | Boigenzahn et al. ................ 360/105 |
| 5,973,887 | * | 10/1999 | Cameron . |

FOREIGN PATENT DOCUMENTS 10-302418 * 11/1998 (JP) .

* cited by examiner

Primary Examiner—William Klimowicz
(74) Attorney, Agent, or Firm—Crowe & Dunlevy

(57) ABSTRACT

An apparatus for latching an actuator of a disc drive at a park position in the presence of applied mechanical shocks. An inertial latching system includes a contact feature coupled to and moveable with the actuator and a stationary surface along and in contact with which the contact feature moves to and from a park position. An inertial latching element is moveable in response to applied mechanical shock from an unlatched position to a latched position, with the inertial latching element normally biased to the unlatched position. The inertial latching element includes a moveable contact surface which, when the inertial latching element is in the latched position, is disposed at an angle relative to the stationary surface, thus forming a narrowing path which prevents the contact feature from moving away from the park position in a critical direction.

13 Claims, 9 Drawing Sheets

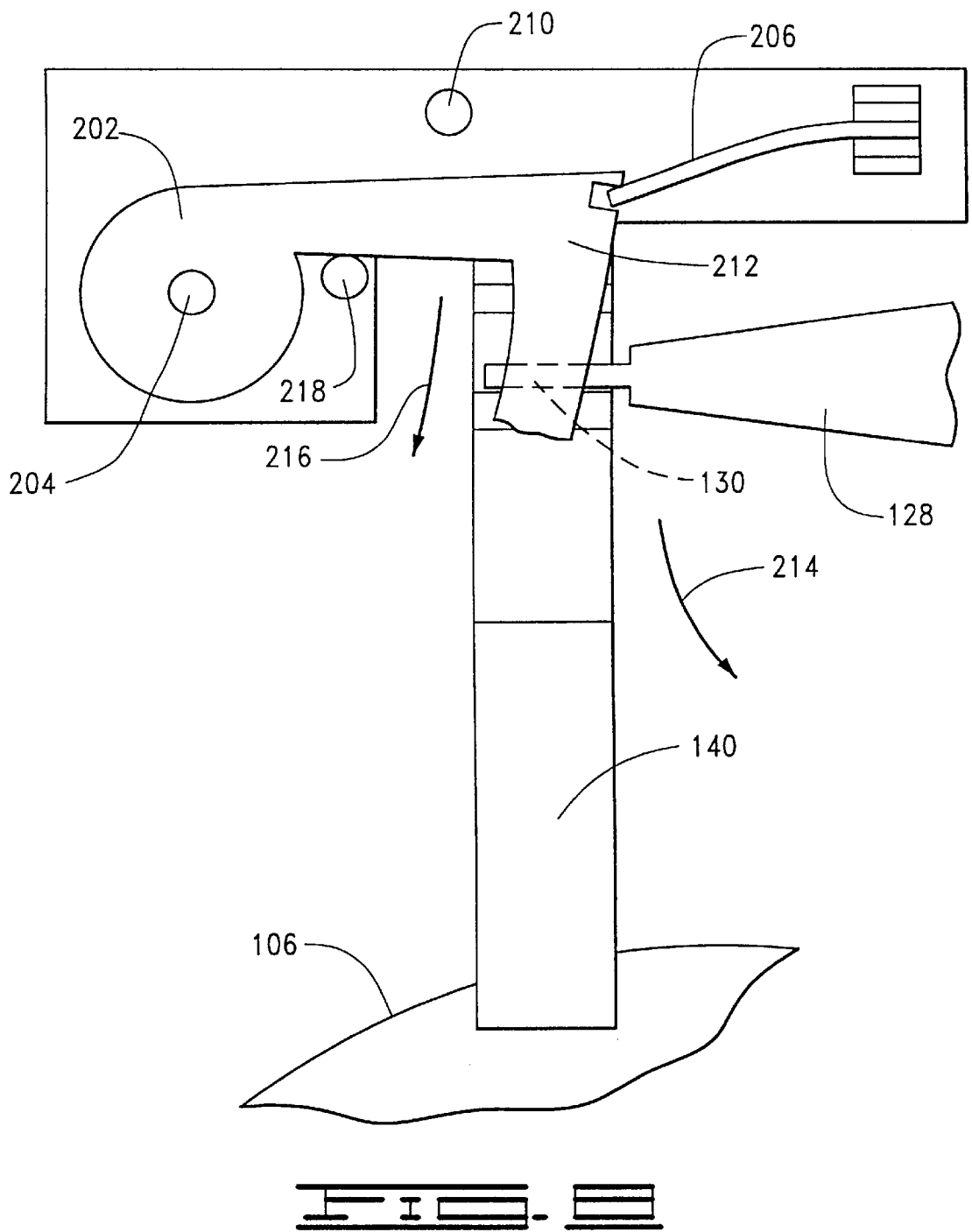

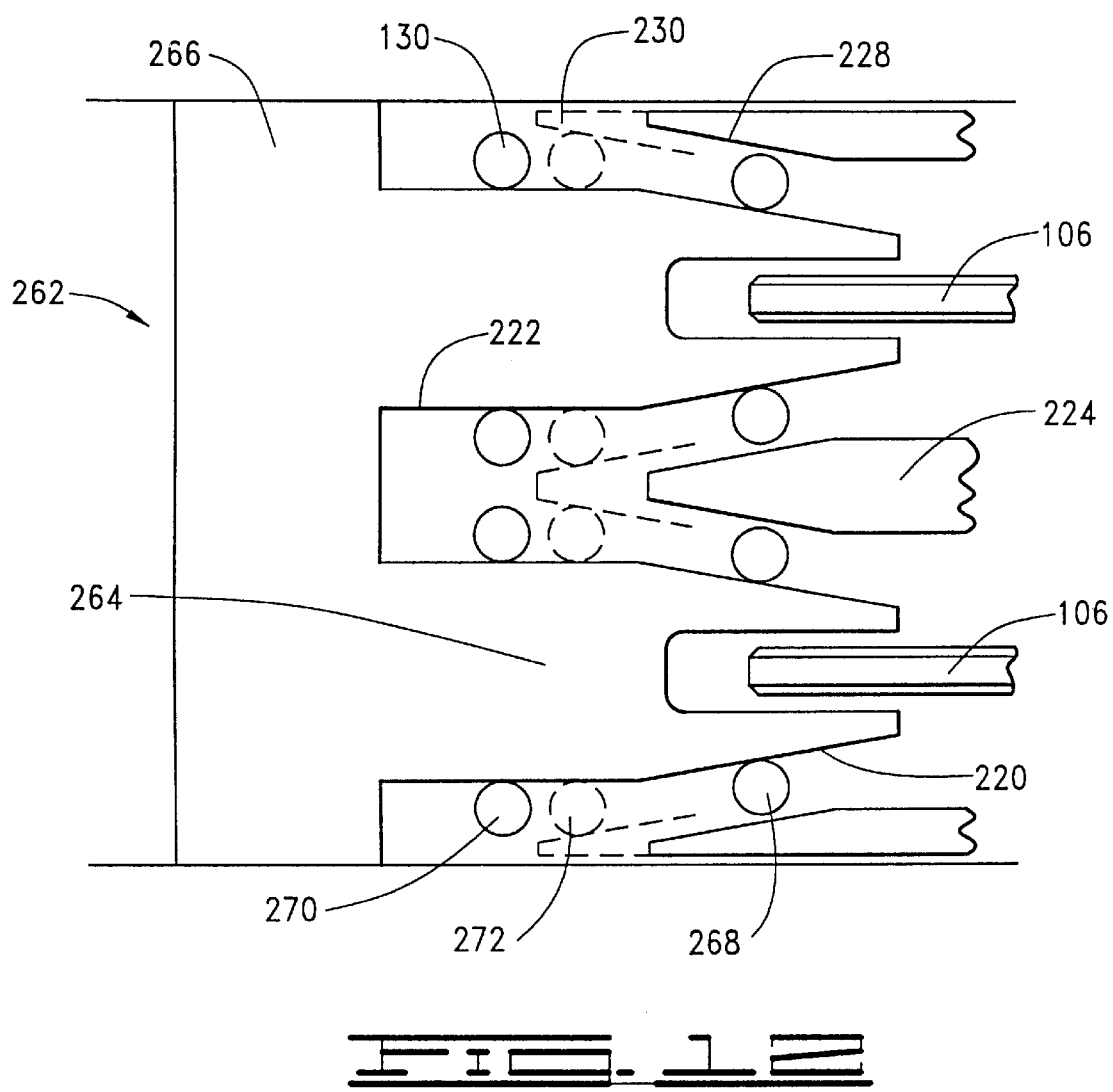

INTERTIAL LATCHING SYSTEM FOR A DISC DRIVE ACTUATOR

RELATED APPLICATIONS

This application claims the benefit of U.S. Provisional Application No. 60/078,879 entitled NOVEL LATCH DESIGN FOR LOAD/UNLOAD SYSTEMS, filed Mar. 20, 1998.

FIELD OF THE INVENTION

This invention relates generally to the field of rigid disc drives, and more particularly, but not by way of limitation, to a system for latching the carriage in a disc drive incorporating ramp loaded and unloaded heads, and holding the carriage in a park position with the heads unloaded from the discs during non-operating conditions in the presence of applied mechanical shocks.

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a boughless direct current spindle motor. In disc drives of the current generation, the spindle motor rotates the discs at speeds of up to 10,000 revolutions per minute (RPM).

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent to the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

The most common type of Winchester disc drive is the "contact start/stop" (CSS) type, in which the heads are in contact with the disc surfaces during non-operating conditions. When power is applied to such disc drives, the spindle motor is accelerated from rest to its operational speed with the start of the spindle motor acceleration occurring while the heads are still in direct contact with the disc surfaces. At some point during the spindle motor acceleration, the heads begin to fly above the discs, and do not directly contact the discs during normal operation.

When power is removed from a CSS type disc drive, the actuator is typically driven to a park position with the heads over a designated "park zone" near the inner diameter of the discs, and as the spindle motor gradually slows to a stop, the heads again come into direct contact with the discs. The actuator is commonly latched at this park position until power is once again restored to the disc drive.

One disadvantage of the CSS type disc drive is that it is subject to "head slap", a phenomenon which occurs when an applied mechanical shock is of sufficient magnitude to overcome the load force of the head suspension used to mount and support the heads. Such uncontrolled separation of the heads and discs is accompanied by uncontrolled re-establishment of head/disc contact, potentially causing damage to the heads, the discs or both.

While CSS type disc drives have been successfully utilized in both desktop and laptop computer systems, the increasingly stringent mechanical shock requirements of both disc drives and the systems within which they are used have lead to an increased utilization of a second type of disc drive, typically referred to as "ramp load/unload" or "dynamic head load/unload" disc drives, hereinafter sometimes referred to as "ramp type" disc drives.

Ramp type disc drives include ramp structures near the outer diameter of the discs on which the heads are "parked" during non-operating conditions. When power is applied to the disc drive, the spindle motor is brought to substantially its operational speed before the latching mechanism holding the heads on the ramp structure is released. The actuator is then moved to controllably move the heads off the ramp structure into engagement with an established air bearing above the discs. Engaging the heads and discs in this manner is commonly referred to as "loading" the heads onto the discs.

Similarly, when a power loss to the disc drive is detected, the heads are moved rapidly outward on the discs, onto the ramp structure and latched in this "unloaded" position with no vertical association with the discs. Thus, in ramp type discs drives, it is the design intention that there will never be any direct contact with the heads and the discs, and that the heads will be radially displaced from the discs during non-operational conditions.

It is apparent to those of skill in the art that, with the heads parked and latched away from the discs during non-operational conditions, the disc drive will be capable of withstanding greater magnitudes of applied mechanical shock than a CSS type disc drive which is subject to such undesirable phenomenon as "head slap".

Since the heads used in current generations of disc drives are mechanically delicate and cannot survive direct contact with ramp structures, it is common for ramp loading and unloading of the heads to be accomplished by contact between the ramp structure and specially designed contact features on the head suspension used to mount and support the head, rather than by contact between the heads themselves and the ramp structure.

Disc drives of the current generation are typically specified to be capable of experiencing applied mechanical shocks during non-operational conditions of 1000 G without incurring any fatal damage, and, as such, the latch mechanism used to hold the actuator at the park location—and the heads on the ramp structure—has become a major focus of engineering effort in the industry.

Actuator latches, or carriage latches, fall broadly into two categories: active and passive. Active latches are typically engaged using the force of the actuator as it moves the heads to the park position, and then must be actively disengaged, or unlatched, through the use of electromechanical mechanisms, such as solenoids. The cost and mechanical complexity of such active latching mechanisms—as well as the physical space required for their implementation—have acted to lessen their use in the industry.

Passive latching mechanisms can be further generally subdivided into two groups: magnetic and inertial. Magnetic latches are the simplest to implement, but have well-understood drawbacks. Magnetic latches are typically implemented by providing a fixed magnetic structure mounted to non-moveable portions of the disc drive and a complementary contact element on the moving portion of the disc drive. When the moving portion of the disc drive is brought into a position where the contact element is in close proximity to the magnet structure—typically very close to the desired park position—the magnetic attraction between the two elements acts to latch the actuator of the disc drive at the park position with a force dependent upon the characteristics of the latch elements. Again typically, the actuator motor is used to overcome the magnetic force of the latch elements and allow the actuator to move away from the park position when internal logic determines that such is desirable.

The main drawback of the magnetic latch is brought about by conflicting requirements: first, the magnetic latch must be capable of maintaining the actuator at the park position in the presence of all specified non-operational applied mechanical shocks, which, it will be recalled, are now typically in the range of 1000 G, and can be expected to increase in the future; second, the actuator motor must be strong enough to provide a force great enough to overcome the latching force, and it must be capable of disengaging the magnetic latch without producing uncontrolled rapid acceleration of the actuator away from the park position at the time of disengagement.

Furthermore, magnetic latches begin to introduce undesirable bias forces on the actuator as the heads approach the park position, and the stronger the magnetic force of the latch is, the stronger this bias force, and the further from the park position it is experienced. For these reasons, magnetic latches are being used less and less in the industry.

The type of actuator latching mechanism most commonly being currently investigated in the industry is the inertial latch. In general terms, an inertial latch has a passive disengaged position in which it is held by a biasing mechanism, such as a magnet or spring. While in the passive disengaged position, the inertial latch allows the actuator to move throughout its entire range without introducing any undesirable bias forces, such as caused by magnetic latches, and further allows the heads to be freely moved to the park position.

Once the disc drive is in its parked condition, however, any applied mechanical shock events which act to move the actuator away from the park position are countered by elements of the inertial latch moving—also in response to the applied mechanical shock—to an engaged condition, in which it prevents the actuator from moving from the park position. At the termination of the shock event, the biasing mechanism mentioned above acts to "reset" the inertial latching mechanism to a disengaged condition, once again allowing the actuator to move the heads from the parked position, should other conditions within the disc drive warrant such a move.

The difficulty of optimizing a single latching mechanism for a particular disc drive under all specified shock loads is evidenced by a recent commercially available disc drive product which included two magnetic latches and an inertial latch. Clearly such complexity, assembly difficulty and associated cost should be avoided if possible.

One difficulty experienced in implementing inertial latches is that the contact surfaces of the latch mechanism and the moving portion of the actuator are encouraged in opposing directions in response to applied mechanical shocks. If the applied mechanical shock is of sufficient magnitude, the accelerations imparted to the latching mechanism and to the moving portion of the actuator can cause the contact surfaces to meet with a high degree of force, resulting in "bounce" at the contact surfaces which tends to overcome the latching mechanism, and the greater the applied mechanical force, the greater the degree of bounce induced. In order to ensure that such bounce at the contact point of the latching mechanism does not act to cause the latch to unintentionally disengage, the bounce frequency of the latch mechanism must be matched to the bounce frequency of the actuator, and such frequency matching is difficult, if not impossible.

A need clearly exists, therefore, for an actuator latching mechanism which is passive, in order to avoid the complexity and expense of active mechanisms, which does not suffer the drawbacks of magnetic latches, and which overcomes the disadvantages of prior art inertial latching mechanisms noted above.

SUMMARY OF THE INVENTION

The present invention is an apparatus for latching an actuator of a disc drive at a park position in the presence of applied mechanical shocks. In accordance with preferred embodiments, an inertial latching system includes a contact feature coupled to and moveable with the actuator, a stationary surface along and in contact with which the contact feature moves to and from a park position. An inertial latching element is moveable in response to applied mechanical shock from an unlatched position to a latched position, with the inertial latching element normally biased to the unlatched position. The inertial latching element includes a moveable contact surface which, when the inertial latching element is in the latched position, is disposed at an angle relative to the stationary surface, thus forming a narrowing path which prevents the contact feature from moving away from the park position in a critical direction. Contact between the contact feature and the stationary and moveable surfaces occurs in a manner which minimizes or eliminates contact bounce at the point of contact. The latching mechanism provides a latching force which is proportional to the magnitude of a mechanical shock applied to the disc drive. The inertial latching mechanism of the inertial latch of the invention can be optimized to respond to various ranges of applied mechanical shock. Various embodiments are disclosed.

The manner in which the present invention achieves the functionality described above, as well as other features, advantages and benefits of the invention, can best be understood by a review of the following detailed description,, when read in conjunction with an examination of the accompanying drawings.

BRIEF DESCRIPTION OF THE DRAWINGS

FIG. 8 is a top plan view, similar to that of FIG. 7, showing the response of the second embodiment of the inertial latching system of the present invention to applied mechanical shock.

FIG. 9 is a simplified diagrammatic elevation view useful for understanding the fundamental operation of the latching mechanism of a second variation of the inertial latching system of the present invention.

FIG. 12 is a simplified elevation view of the third embodiment of the latching system of the present invention.

DETAILED DESCRIPTION

Figure 1:
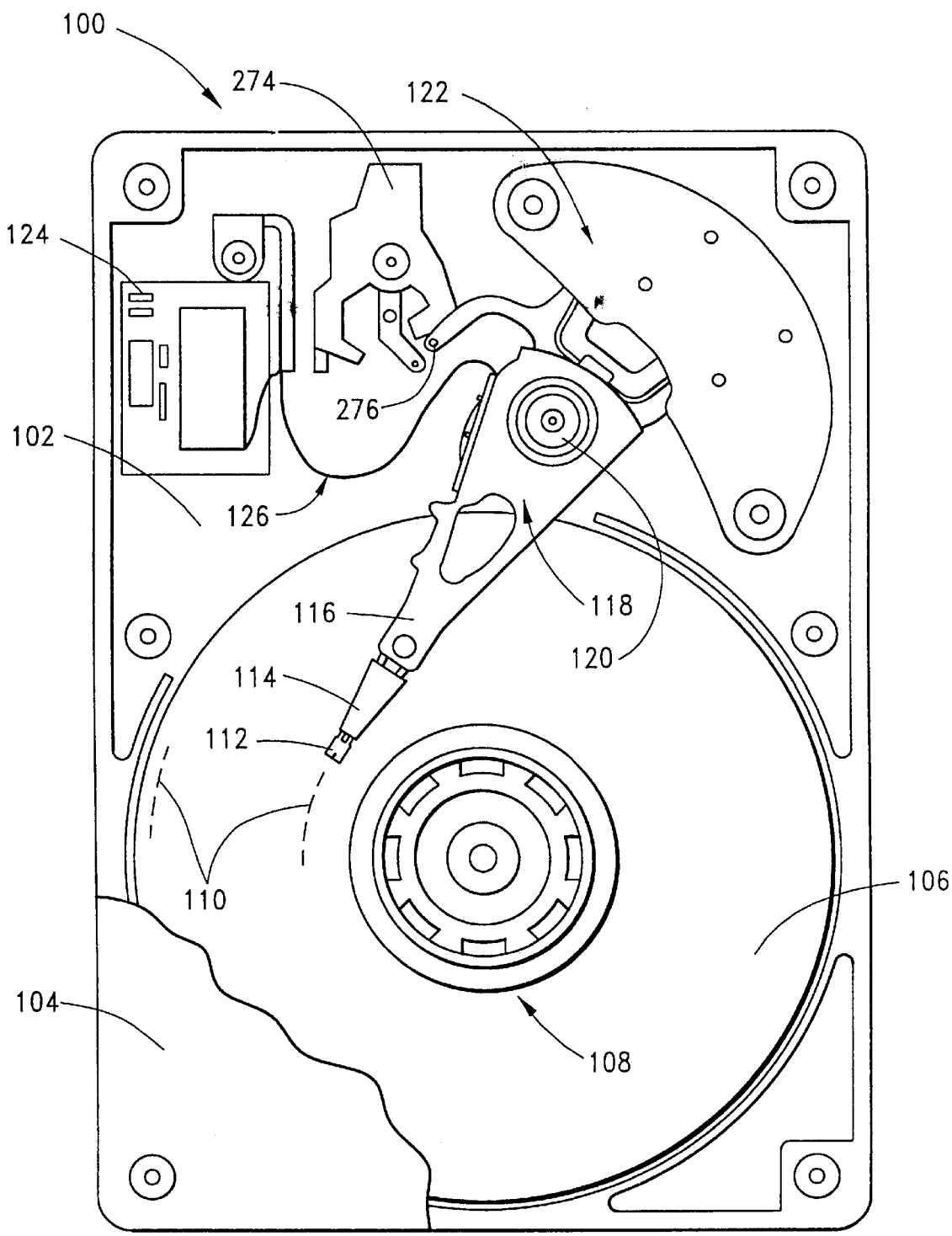
FIG. 1 is a top plan view of a prior art disc drive in which the present invention may be advantageously incorporated.

Turning now to the drawings and specifically to FIG. 1, shown is a plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of precision ball bearing assemblies (not designated) for rotation about a pivot shaft 120.

Power to drive the actuator bearing housing 118 in its rotation about the pivot shaft 120 is provided by a voice coil motor (VC) shown generally at 122. The VC 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VC 122, as well as data signals to and from the heads 112, carried between the electronic circuitry 124 and the moving actuator assembly via a flexible printed circuit cable (PCT) 126.

The disc drive 100 of FIG. 1 is of the contact start/stop (CSS) type described previously herein above, and the park position would be as shown in the figure, with the heads 112 positioned closely adjacent the spindle motor 108 in order to minimize the torque required to overcome the frictional contact between the heads 112 and discs 106 when the spindle motor 108 first begins to accelerate from rest.

Figure 2:
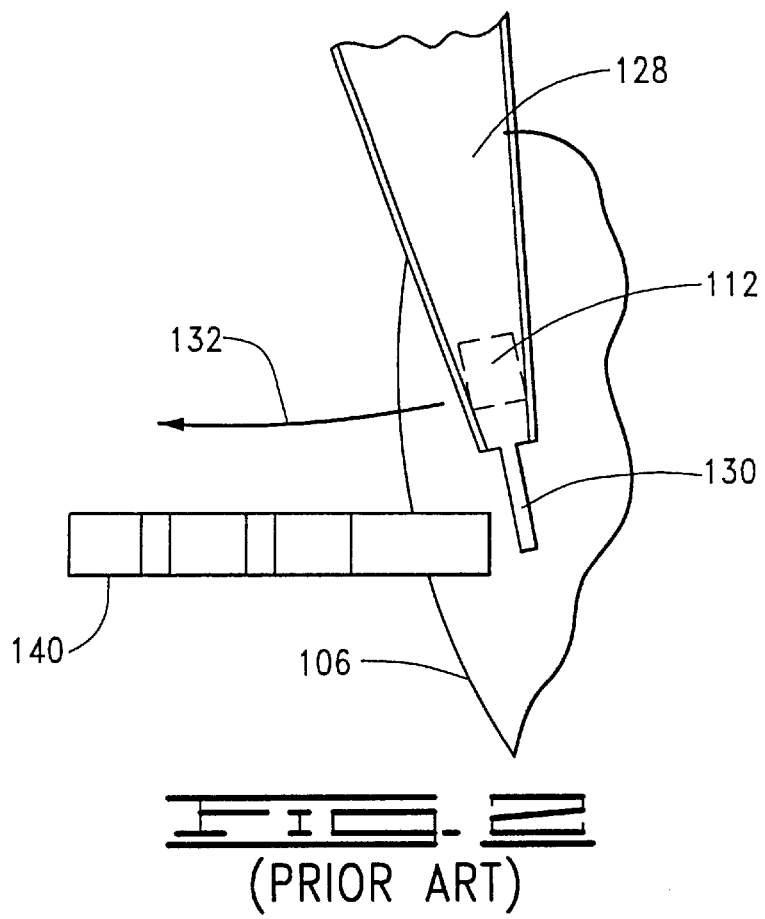
FIG. 2 is a partial top plan view of relevant elements of a prior art ramp type disc drive.

FIG. 2 is a partial top plan view of relevant elements of a prior art ramp type disc drive. Shown are a disc 106 and a head assembly 112 which is mounted on a head suspension 128 especially modified to implement ramp loading and unloading of the head 112. Specifically, the head suspension has been modified to include a longitudinally extending tang, or ramp contacting feature 130.

It will be apparent from FIG. 2 that, as the actuator (not shown) rotates the head suspension 128 radially outward over the disc 106 in the direction of arrow 132, the ramp contacting feature 130 of the head suspension 128 will contact a ramp structure 140 fixedly located near the outer periphery of the disc 106. As the actuator continues to move the head suspension 128 in the direction of arrow 132, it is also evident that the head assembly 112 will be moved radially outward from the outermost extent of the disc 106 as the ramp contact feature 130 traverses the length of the ramp structure 140, thus preventing any potentially damaging contact between the head 112 and the disc 106 as long as the ramp contact feature 130 is at a position on the ramp structure sufficiently removed from the disc 106. The defined park position for the head 112 will thus be a location where the head 112 is not vertically overlapping the disc 106, and the manner in which such a prior art disc drive maintains the heads 112 at the park position will be discussed below.

Figure 3:
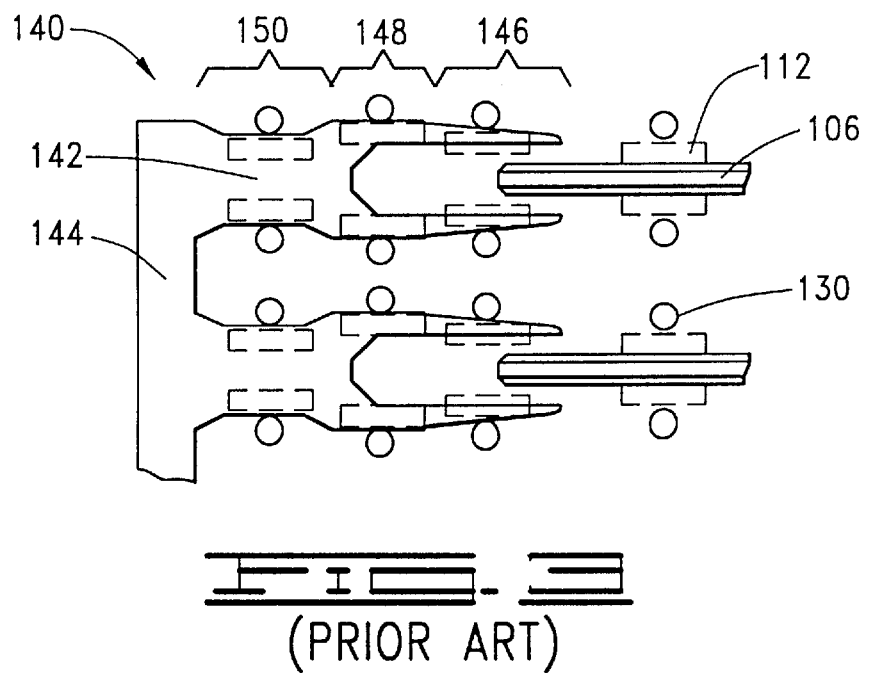
FIG. 3 is an elevation view, partially in section, of the prior art ramp type disc drive of FIG. 2.

FIG. 3 is a simplified partial elevation view of the disc drive structure described above in relationship to FIG. 2. FIG. 3 shows two discs 106 and a head assembly 112 associated with each surface of each of the discs 106. One of skill will realize that the ensuing discussion is applicable, however, to disc drives incorporating either a single disc 106 or a greater number of discs 106.

In the figure, each of the heads 112 is also shown in association with a ramp contacting feature 130, which, it will be recalled, is a part of the head suspension (128 in FIG. 2) used to mount and support the head 112. In FIG. 3, the ramp contacting features 130 are shown in end sectional view, and can be seen to be cylindrical in form.

FIG. 3 also shows a typical prior art ramp structure 140, which consists of a plurality of ramp fingers 142 extending from a common backing portion 144 and including, at their distal ends, slots (not numerically designated) to allow the ramp fingers 142 to slightly overlap the outer extreme of the discs 106.

Each of the ramp fingers 142 in FIG. 3 can be seen to include vertically opposed contact surfaces (not separately designated) each consisting of a beveled ramp portion, a level portion and a detent portion designated generally by numeric references 146, 148 and 150, respectively.

FIG. 3 shows the heads 112 with associated ramp contacting features in several different positions indicative of various stages of disc drive operation, and it should be recalled that at all times the heads 112 associated with each disc surface are vertically aligned and moved together by the actuator. Specifically, at the right of FIG. 3, the heads 112 are shown in operational engagement with the surfaces of the discs 112. When it becomes necessary to park the heads 112, the heads 112 are moved outward on the discs 106, or to the left in the figure, until such point as the ramp contacting features 130 engage the beveled ramp portion 146 of the ramp fingers 142. As the heads 112 continue to move radially outward in relation to the discs 106, the angle of the beveled ramp portion 146 causes the heads 112 to not only be moved radially outward, but also to be vertically lifted away from the disc surfaces. Even though it is readily seen in FIG. 3 that the actual direction of vertical movement of the heads 112 is dependent upon the side of the disc with which the head is engaged, for purposes of the ensuing discussion, the terms "up", "down" and other such directional references should be interpreted as being made in relationship to the disc surfaces, with "up" meaning away from the disc surface and "down" meaning toward the disc surface.

When the heads 112 reach the top of the beveled ramp portion 146, they are at their greatest vertical separation from the disc surfaces and can also be seen to be well outside the greatest radial extent of the discs 106. Further radially outward motion of the actuator causes the heads 112 to traverse the level portion 148, and eventually to arrive at the detent portion 150 of the ramp fingers 142. The detent portions 150 can be seen in FIG. 3 to include angled end portions (not separately designated) and a flat or level rest portion (also not separately designated).

As is well known to those of skill in the art, the head suspensions used to mount and support head assemblies in discs drives include a load mechanism which acts to encourage the heads toward the discs and to balance the hydrodynamic lifting force of the air bearing established between the spinning discs and the heads. This load force acts to keep the ramp contacting features 130 firmly engaged to the ramp structure as the ramp contacting features 130 move from initial contact with the beveled portions 146 of the ramp fingers 142 to the level portions 148 and into the detent portions 150.

It will also be appreciated by those of skill in the art that, once the ramp contacting features 130 are positioned on the rest portion of the detent portions 150, any force acting to move the heads toward the right in the figure, i.e., back toward the discs 106, must overcome the combined load forces of all of the head suspensions in the head stack and the frictional forces between all of the ramp contacting features and the angled end portions of the detent portions 150 of the ramp fingers 142. Thus, the load force of the head suspensions and the "notched" nature of the detent portion 150 of the ramp structure 140 acts to maintain the heads in alignment with the detent portion until a force great enough to move the ramp contacting features up out of the detent portions is exerted on the actuator. Indeed, many prior art disc drives utilized solely such ramp detents as the latching mechanism to hold the heads at the park position. However, the increased mechanical shock specifications of disc drives of the current generation makes such "detent latches" inadequate.

Prior art solutions to the inadequacy of mere detent latches typically involve the use of a separate latching mechanism, such as the previously discussed active latches or passive magnetic or inertial latches, the drawbacks of which have also been discussed herein above.

Figure 4:
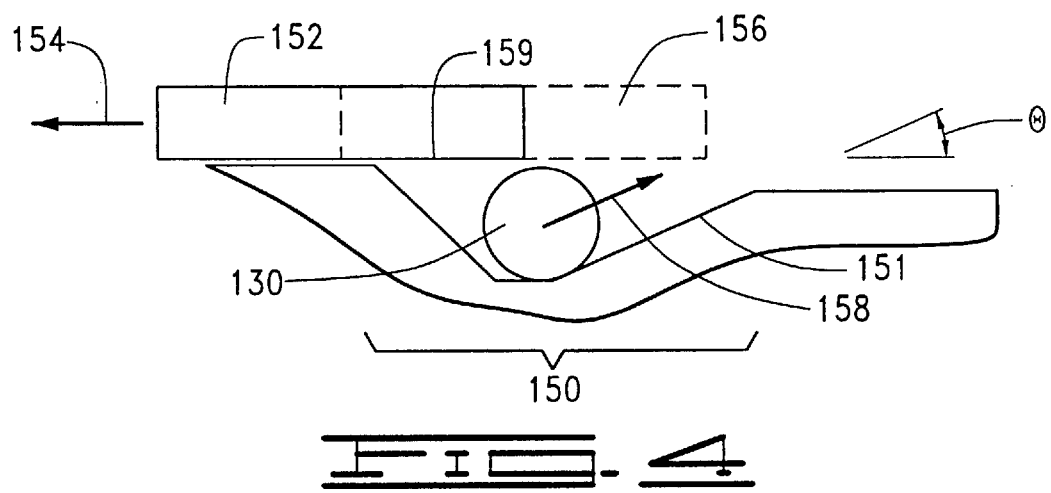
FIG. 4 is a simplified diagrammatic elevation view useful for understanding the fundamental operation of the latching mechanism of the inertial latching system of the present invention.
Figure 3:
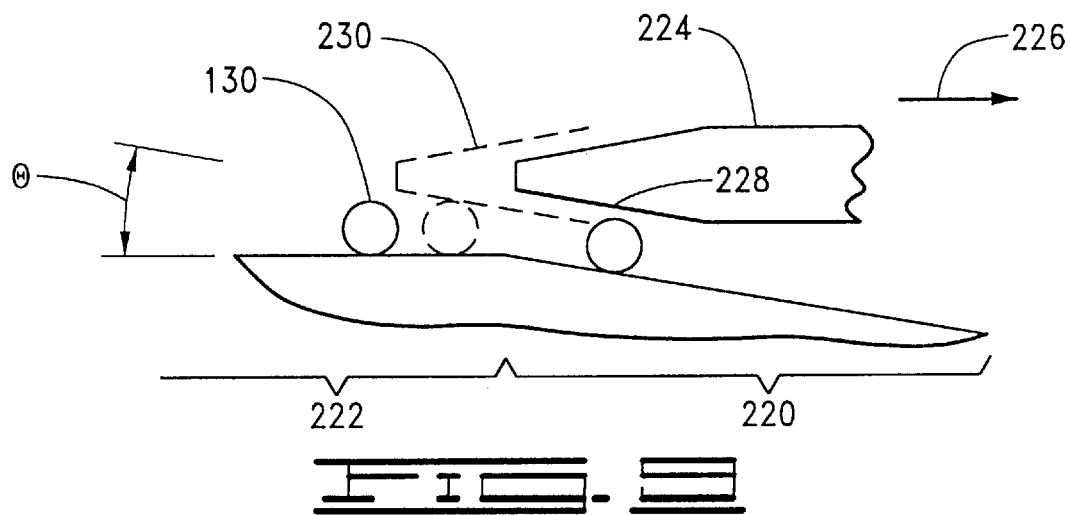

FIG. 4 is a simplified diagrammatic elevation view showing the fundamental operation of the inertial latching system of the present invention.

FIG. 4 shows the contact surface of a ramp structure including a detent portion 150 within which a ramp contacting feature 130 associated with a head assembly (not shown) is resting. Having the ramp contacting feature 130 within the detent portion of the ramp structure is defined as having the actuator at the park position.

In FIG. 4, the detent portion 150 of the ramp structure can be seen to include an inward bevel 151, with the inward direction being defined as toward the disc with which the head assembly is intended to cooperate.

FIG. 4 also shows a moveable latch element, in solid lines at 152. The position of the latch element 152 shown in solid lines indicates the quiescent, or unlatched position of the latch element 152, and the latch element is maintained in this position by a biasing force, represented by arrow 154.

With the latch element 152 in the unlatched position, it is apparent that the ramp contacting feature is free to move to the right, up the inward bevel 151, to permit cooperative engagement of the head assembly (not shown) with the disc (also not shown in this figure). Thus, when the latch element 152 is in the unlatched position, a disc drive incorporating the present invention operates identically to disc drives incorporating prior art detent ramp structures, such as was described above with regard to FIG. 3, and it is only in the presence of applied mechanical shocks which tend to move the heads in a uncontrolled manner toward the disc that the present invention exhibits its functionality.

An applied mechanical shock that tends to move the heads toward the discs, that is, in the direction of arrow 158, will also serve to act on the moveable latch element 152, moving it in the same relative direction to a latched position, as shown by dashed lines at 156. Such movement is in opposition to the biasing force 154.

It will be apparent to those of skill in the art that, in order to be a functional inertial latching system, the latch element 152 must respond to the applied mechanical shock more quickly than does the entire actuator of the disc drive. Thus, when the ramp contacting feature 130 begins to travel up the inward bevel 151 of the detent portion 150 of the ramp structure, the upper surface of the ramp contacting feature will come into contact with the moveable contact surface 159 of the latch element 152 in the latched position 156. The invention envisions that other elements (not shown in FIG. 4) will act to constrain the movement of the latch element 152 from the unlatched position shown in solid lines to the latched position 156 shown in dashed lines and back. Thus, during inertial latching conditions, the ramp contacting feature 130 will be squeezed, or wedged, by the oblique intersecting angle θ of the inward bevel 151 of the detent portion 150 of the ramp structure, and the moveable contact surface 159 of the latch element 152. Such oblique, or angular, contact between the ramp contacting feature 130 and the latch element 152 is much less likely to result in "bounce" at the point of contact than if the two elements were moving directionally opposite to each other, as is the case with many prior art inertial latching systems.

Furthermore, it will be apparent that increases in the force acting to move the ramp contacting feature 130 to the right in the figure will also act to increase the wedging force applied by the latch element 152 to the ramp contacting feature 130. Additionally, while the latch element 152 and ramp contacting feature 130 are in this latched condition, frictional contact between the elements will act to prevent the biasing force 154 from returning the latch element to its unlatched position for the duration of the shock event.

Once the shock event is terminated, the load force of the head suspension (discussed above in regard to the prior art of FIG. 3) will act to move the ramp contacting feature 130 back down the inward bevel 151 of the detent portion 150 of the ramp structure, lessening the wedging force of the latching engagement. When the latching force reaches a certain level, dependent on the frictional characteristics of the latch element 152 and the ramp contacting feature 130, the biasing force 154 will act to return the latch element 152 to the unlatched position shown by the solid lines, and the heads are maintained at the park position solely by the detent force, as discussed above with regard to FIG. 3, allowing the actuator to controllably move the heads into cooperative engagement with the discs in the absence of further applied mechanical shocks.

Thus, the general operation of the present invention can be considered as a ramp contacting feature (130) which contacts and moves along a stationary surface (the ramp structure surface) as the actuator moves to and from a park position. A moveable inertial element (152) is normally biased to an unlatched position (as shown by solid lines in FIG. 4), allowing free movement of the ramp contacting feature to and from the park position. The inertial element is moveable in response to applied mechanical shocks to a latched position (as shown by dashed lines at 156 in FIG. 4). When the moveable inertial element 152 is in the latched position, the stationary surface (as represented in the figure by the inward bevel 151 of the detent portion of the ramp structure) and a moveable contact surface (the lower surface 159 of the inertial element 152) are disposed at an angle θ, such that the stationary surface and the moveable surface form a narrowing path which prevents motion of the ramp contacting feature 130 in the critical direction.

One of skill in the art will appreciate that the response of the latch element 152 to applied mechanical shock will be a function of the magnitude of the applied mechanical shock, the mass of the moveable latch element 152 and the characteristics of the bias force 154, and will further appreciate that it may be difficult, if not impossible, to implement a single configuration of the shown components that will react properly to all magnitudes and durations of applied mechanical shocks. Other aspects of the present invention, intended to overcome this potential drawback, will be discussed herein below.

Figure 5:
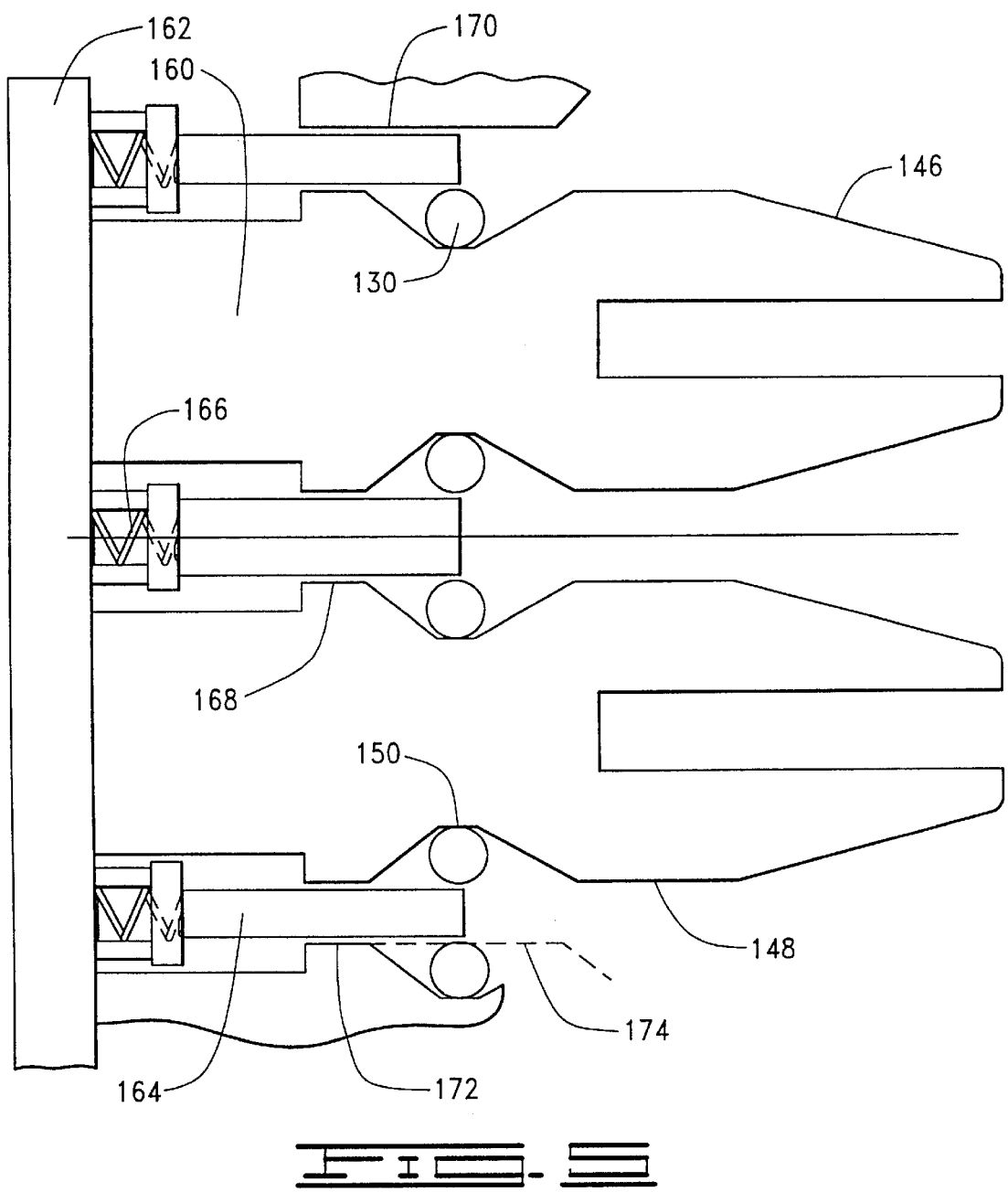
FIG. 5 is a simplified elevation view of a first embodiment of the inertial latching system of the present invention in its quiescent, or unlatched state.

FIG. 5 is a simplified elevation view of a first embodiment of the latching system of the present invention, and shows a plurality of ramp fingers 160, each including upper and lower contact surfaces (not separately designated) each, in turn, consisting of a beveled ramp portion 146, a level portion 148 and a detent portion 150, similar to those shown in the prior art of FIG. 3. The ramp fingers 160 are shown attached to a common backing element 162. If fabrication allows, the present invention envisions that the ramp fingers 160 and backing element 162 can be formed as a single unitary component, and thus the scope of the present invention is not considered as limited by the manner in which the ramp fingers 160 and backing element 162 are connected.

FIG. 5 also shows a plurality of ramp contacting features 130 resting in the detent portions 150 of the ramp fingers 160, and, again, this position of the ramp contacting features 130 is considered to be the park position of the associated heads (not shown).

Also shown in FIG. 5 is a plurality of latch elements 164 mounted to the backing element 162 by biasing apparatus in the form of coil spring elements 166. The coil spring elements 166 act to maintain the latch elements in the quiescent, unlatched position shown in FIG. 5 in the absence of applied mechanical shocks.

In FIG. 5 it can also be seen that the ramp fingers 160 include guide surfaces 168 which act to define the path of allowable motion of the latch elements 164. Specifically, the guide surfaces 168 act to confine allowable motion of the latch elements 164 within a plane, while other guide elements (not shown) act in concert with the guide elements 168 to restrict the allowable motion of the latch elements to linear motion, as will be discussed further below.

While FIG. 5 shows a pair of ramp fingers 160, the scope of the invention is envisioned to encompass both disc drive configurations incorporating a single ramp finger 160 (and, thus, a single disc, not shown) and configurations incorporating a larger number of ramp fingers 160 and discs.

FIG. 5 also shows that the uppermost latch element 164 is guided on its upper surface by a top guide surface 170. This top guide surface can be formed as attached to the backing element 162, or alternatively, as a portion of a top cover (such as that designated 104 in FIG. 1). The lowermost latch element 164 in FIG. 5 can be seen to also have a guide surface associated with its lower surface, and this guide surface can be either a guide surface associated with another ramp finger 160, as shown by solid lines at 172, or can be formed as a portion of a base member (such as that shown at 102 in FIG. 1) and extend as shown by dashed lines at 174. The function of the guide surfaces 168, 170, 172, 174 will be discussed in more detail below.

In the absence of applied mechanical shocks, a disc drive incorporating the inertial latching system of the present invention functions similarly to that of the prior art of FIG. 3. That is, the ramp contacting features 130 are not constrained, except by the load force of the head suspensions and the detent portions 150 of the ramp fingers, and are thus free to be moved by the actuator to the right in the figure, across the level portions 148 of the ramp structure, down the beveled ramp portions 146, bringing the associated heads (not shown) into cooperative engagement with the discs (also not shown). It should be noted that, since all of the ramp contacting features 130 are moved simultaneously by the actuator, immediately adjacent level portions 148 of the ramp fingers 160 must be separated by sufficient vertical space to allow the simultaneous passage of a pair of immediately adjacent ramp contacting features 130.

Figure 6:
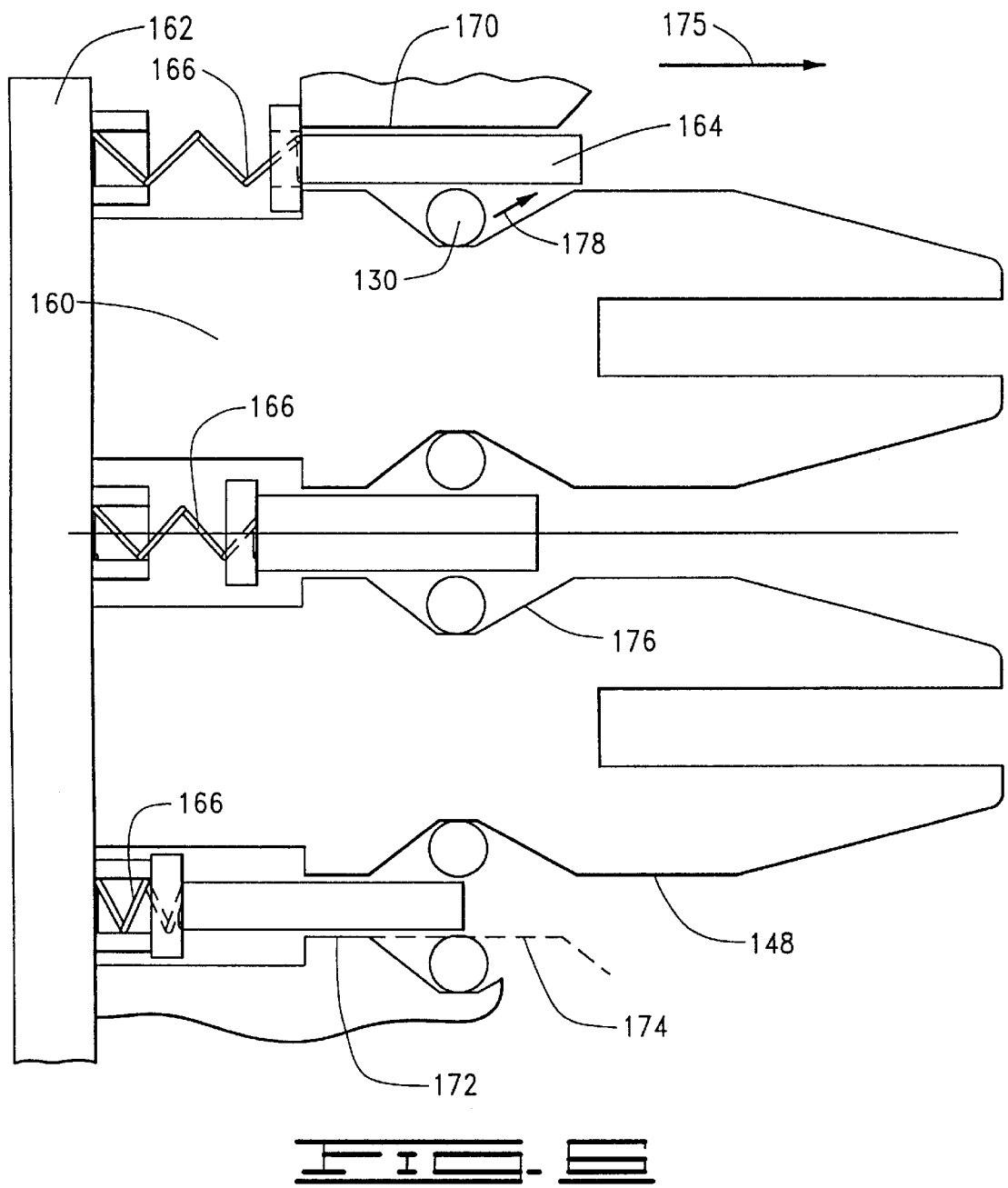
FIG. 6 is a simplified elevation view, similar to that of FIG. 5, showing the response of the first embodiment of the inertial latching system of the present invention to applied mechanical shock.

FIG. 6 is a simplified elevation view, similar to that of FIG. 5, showing the response of the inertial latching system of the present invention to the application of mechanical shocks which tend to uncontrollably move the heads into engagement with the discs. Such applied mechanical shocks exert a force on the actuator in the direction of arrow 175, and tend to drive the ramp contacting features 130 up the inward bevel 176 of the detent portion (not designated) of the ramp fingers 160 in the direction noted by arrow 178. If other mechanisms, such as the inertial latching system of the present invention, are not included, these shock events can cause the heads to move in a uncontrolled manner away from the designated park position and into potentially damaging contact with the discs.

FIG. 6 shows, however, that the same applied mechanical shock which tries to move the ramp contact features 130— and associated heads—to the right in the figure, also acts to overcome the bias force provided by the spring elements 166 and move at least one of the latch elements 164 into its engaged, or latched, position, as specifically seen in the uppermost latch element 164. Since it is envisioned by the invention that the response of the latching elements 164 to the application of mechanical shocks will be faster than the response of the actuator, the latch element 164 will be in its latched position before the actuator begins moving the ramp contacting features 130 toward the discs. Once again, as discussed above with regard to FIG. 4, the oblique angle between the inward bevel 176 and the surfaces of the latch elements 164 causes a squeezing, or pinching, or wedging force to be exerted on the ramp contacting features 130, stopping their inward motion relative to the discs. The frictional forces generated by this contact also act to hold the involved latch element 164 in the latched position until the termination of the shock event, even in the presence of the bias forces applied to the latch elements 164 by the spring elements 166.

Once the shock event ends, the load force of the head suspensions acts to drive the ramp contacting features 130 back down the inward bevel 176 of the detent portion of the ramp fingers 160, removing the frictional force on the latch elements 164 and allowing the spring elements 166 to move the latch elements back to their quiescent, unlatched positions as shown in FIG. 5.

Several unique features and benefits of the present invention are also illustrated in FIG. 6. Firstly, the uppermost latch element 164 in the figure will be constrained in response to the shock event by contact between the latch element 164, the moving ramp contacting feature and the top guide surface 170, which, it will be recalled, is fixedly located by attachment to the backing element 162 or by being part of the top cover of the disc drive.

Similarly, immediately adjacent ramp contacting features 130 will bear against opposing surfaces of a common latch element 164, as can be seen in the case of the two middle ramp contacting features 130, and thus act in a manner similar to the topmost ramp contacting feature and the topmost latch element 164.

Finally, the lowermost ramp contacting feature 130 will be constrained by contact between itself and the bottom latch element 130, which is, in turn bearing against the bottom guide surface 172. Thus, any interaction between active latch elements 164 and moving ramp contacting features 130 will act to prevent uncontrolled movement of the actuator as a result of applied mechanical shocks.

This "multiple latching" capability leads to a second advantage of the present invention.

If the relative positions of the three latch elements 164 of FIG. 6 are examined, it can be seen that each of the three latch elements 164 shown have reacted differently and independently in response to the applied mechanical shock. That is, the uppermost latch element 164 has been moved to a "fully-engaged" position, the middle latch element 164 shown has moved part way from its unlatched position, as shown in FIG. 5, and the lowermost latch element 164 shown in FIG. 6 has not moved from its unlatched position. This difference in response is due to the fact that each of the latch elements 164 is free to move independently of the others, and has a unique biasing spring element 166. The present invention envisions that the response of each latch element can be individually "tuned" by controlling the mass and bias force for each latch element 164, thus enabling the latching system to be optimized for various ranges of applied mechanical shock magnitudes and durations. Since each latch element 164 can be optimized for a specifically characterized response, the latching system provides a wider capability of response than can be achieved by prior art inertial latching systems which employ a single inertial element, and which must, of necessity, have a maximum sensitivity to a single, narrow range of mechanical shock magnitudes and frequency. Thus, since any one of the latch elements 164 is capable of locking the actuator in the presence of applied mechanical shocks, and since each latch element can be individually optimized to respond to a particular range of mechanical shock magnitudes and frequencies, the inertial latching system of the present invention provides a significant advantage over prior art inertial latching systems which employ a single inertial element.

In the example embodiment of the invention shown in FIGS. 5 and 6, the uppermost latch element 164 is shown as being most sensitive to applied mechanical shocks, while the middle latch element 164 requires the application of a mechanical shock of greater magnitude to move to its fully locked position. Similarly, the lowermost latch element 164 shown would be responsive only to a still greater mechanical shock. Such individual tuning of each of the latch elements 164 allows the inertial latching system of the present invention to be responsive to a wide range of mechanical shocks, from very mild to very severe. While the example embodiment of FIGS. 5 and 6 shows the shock sensitivity of the latch elements decreasing progressively from top to bottom, latch elements having differing sensitivities can be arranged in any order without exceeding the envisioned scope of the invention.

An examination of FIGS. 5 and 6 shows that the ends of the inertial latching elements 164 closest to the bias springs 166 include flanges (not numerically designated) which interact with other features of the backing element 162 and the ramp fingers 160 to define the allowable range of motion of the inertial latching elements 164 as they move from the unlatched to the latched positions. One of skill in the art will also appreciate that the biasing system can be constructed using other apparatus than the coil springs shown, such as leaf springs, whisker springs or magnetic biasing systems. While certain other biasing systems will be disclosed below in discussions of alternative embodiments, it is contemplated by the present invention that appropriate limit stops to define the range of motion of the latch elements and the biasing system used to implement the invention can take many forms, and, therefore, the specific implementation of such limit stops and biasing systems is not considered as limiting to the envisioned scope of the invention.

Figure 7:
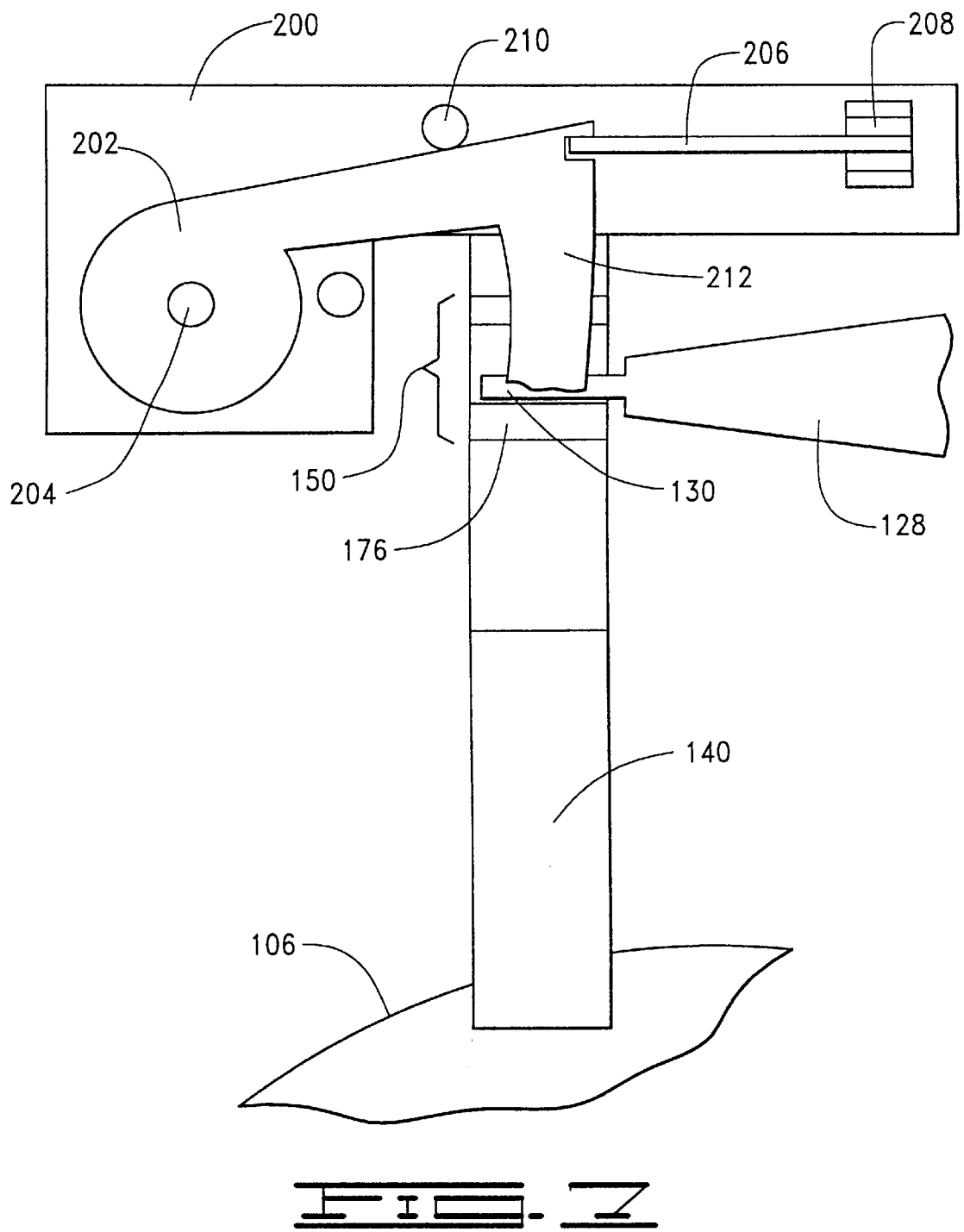
FIG. 7 is a top plan view of a second embodiment of the inertial latching system of the present invention in its quiescent, or unlatched state.

While FIGS. 5 and 6 show a first embodiment of the inertial latching system of the present invention that allows the latching elements 164 to move in a linear fashion in response to applied mechanical shocks, as guided by guide surfaces 168, 170, 172 and 174, FIGS. 7 and 8 show an alternative embodiment.

FIG. 7 is a simplified top plan view of a second embodiment of the inertial latching system of the present invention, and shows components in the park position and as they would be without the effects of applied mechanical shock. Specifically, FIG. 7 shows a head suspension 128 with a ramp contacting feature 130. The ramp contacting feature 130 is at rest in the detent portion 150 of a ramp structure 140 slightly overlapping the outer diameter of a disc 106, all similar to components shown in FIG. 2.

FIG. 7 also shows a latch and ramp mounting element 200, to which the ramp structure 140 is fixedly attached. The latch and ramp mounting element 200 can be used to mount the entire ramp and latch assembly within the disc drive.

The latch and ramp mounting element 200 can also be seen to support a latch element 202, which is adapted for rotation about a pivot pin 204. The latch element 202 is shown in its quiescent or unlatched position, and is biased into this position by a spring element 206. The spring element 206 can be a leaf spring, or a whisker spring, and is fixedly mounted to the latch and ramp mounting element 200 by a spring holding element 208. A limit to the counterclockwise movement of the latch element 202 is established by an unlatch limit pin 210. Thus, the quiescent unlatched position of the latch element 202 is established by the spring element 206 biasing the latch element 202 into contact with the unlatch limit pin 210.

An examination of FIG. 7 reveals that, with the latch element 202 in the unlatched position shown, the ramp contacting feature 130 of the head suspension 128 is free to move up the inward bevel 176 of the detent portion 150 of the ramp structure 140 without contacting the contact portion 212 of the latching element 202. Therefore, in the absence of applied mechanical shocks, the disc drive illustrated in FIG. 7 operates in a manner similar to that of the prior art of FIGS. 2 and 3.

FIG. 8 is a top plan view, similar to that of FIG. 7, showing the effect of an applied mechanical shock that acts to move the head suspension 128 off the ramp structure 140 and onto the surface of the disc 106, i.e., in the direction of arrow 214. Such an applied mechanical shock, however, also acts on the moveable latch element 202, causing it to pivot clockwise about the pivot pin 204, as illustrated by arrow 216. The range of motion of the latch element 202 is limited in the direction of arrow 216 by a latch limit pin 218.

The mass of the latching element 202 and the force of the spring element 206 are selected such that the latch element 202 reacts to the application of mechanical shocks faster than does the actuator (not shown) supporting the head suspension. This means that before the ramp contacting feature 130 can move up the inward bevel (176 in FIG. 7) of the detent portion (150 in FIG. 7) of the ramp structure 140, the contact portion 212 of the latch element 202 has rotated into the latched position shown, blocking the path of motion of the ramp contacting feature 130 in a manner similar to that described in the discussion of FIG. 6. That is, the angle formed between the inward bevel 176 and the lower surface of the contact portion 212 of the latch element 202 causes the ramp contacting feature to be squeezed, or wedged, as it attempts to move up the inward bevel 176.

It can also be seen in FIG. 8 that the rotation of the latch element 202 in response to the applied mechanical shock overcomes the force of the spring element 206 causing it to bend and build up internal stress within the spring element 206 which tends to drive the latch element 202 back to its quiescent unlatched position. During the shock event, however, the contact between the ramp contacting element 130, the contact portion 212 of the latch element 202 and the inward bevel 176 of the ramp structure 140 generates a frictional force which acts to prevent the latch element 202 from moving back to the unlatched position of FIG. 7 until the shock event is terminated. Once again, it will be apparent to one of skill in the art that the magnitude of the frictional force keeping the latch element 202 in the latched position will be directly proportional to the magnitude of the applied mechanical shock. Upon termination of the shock event, the load force of the head suspension 128 acts to drive the ramp contacting feature 130 back down the inward bevel 176 to the park position, releasing the latch element 202 to rotate back to the unlatched position against the limit pin 210 under influence of the spring element 206.

While FIGS. 7 and 8 show a single latch element 202, it will be readily apparent to one of skill in the art that a plurality of latch elements 202 can be provided in a manner similar to that of the linear embodiment of FIGS. 5 and 6, and that each of this plurality of latch elements can be optimized to respond to varying levels of shock by selecting the mass of the latch elements 202 and the strength of the biasing spring elements. Again, such a combination enables the inertial latching system of the present invention to be significantly more effective over a wide range of applied mechanical shock magnitudes and frequencies than can any of the prior art inertial latching systems, which employ a single inertial element.

FIG. 9 is a simplified diagrammatic elevation view useful for understanding the fundamental operation of the latching mechanism of a second variation of the inertial latching system of the present invention. This variation of the inertial latching system of the present invention can be seen in FIG. 9 to include a ramp structure (not separately designated) which includes a beveled portion 220 and a flat portion 222. This variation contemplates that the park position will be defined as having the ramp contacting feature 130 resting on the flat portion 222 of the ramp structure, as shown at the left of the figure, rather than in a detent, as was the case for the previously described variation of FIG. 4.

An inertial latching element 224 is shown in solid lines in its quiescent, or unlatched, position, at which it is maintained by an applied biasing force applied in the direction shown by arrow 226 as shown in FIG. 9. The inertial latching element 224 includes a beveled moveable contact surface 228, and when the inertial latching element 224 is in the unlatched position shown by solid lines, the ramp contacting feature 130 is free to move between the park position shown on the left of the figure and down the beveled portion 220 of the ramp structure, as can be seen at the right of the figure. Thus, in this variation of the inertial latching system of the present invention, there is no "detent latching", as contemplated by the first variation of FIGS. 4 through 8. The absence of the detent in the ramp structure allows for more easily controlled movement of the ramp contacting feature 130 from the park position on the flat portion 222 of the ramp structure, down the beveled portion 220 of the ramp structure to bring the associated head (not shown in the figure) into cooperative engagement with the disc (also not shown in the figure). When it is recalled that the movement of the ramp contacting feature 130 off the ramp structure is controlled by the actuator, it will be appreciated that the first variation of FIGS. 4 through 8 requires that the actuator apply a relatively large force to move the ramp contacting features 130 out of the detent portion (151 in FIG. 4). If this relatively large force is maintained after the ramp contacting features depart the detent portion, the actuator will experience sudden acceleration when the ramp contacting features arrive at the flat portion (148 in FIG. 5) of the ramp structure. Since there can be no closed-loop servo control of the actuator until the heads are engaged with the discs, the first variation thus necessitates a complex current profile for moving the heads from the park position onto the discs.

The second variation of FIG. 9, however, since it lacks ramp detents, allows a comparatively simple current profile to be applied to the actuator to controllably move the heads from the park position into engagement with the discs.

Returning to FIG. 9, the application of mechanical shock to the disc drive causes the inertial latching element to move from its unlatched position 224 to a latched position shown by dashed lines at 230. The same mechanical shock tends to move the ramp contacting feature 130 toward the disc, i.e., to the right in the figure, as shown in FIG. 9 by a "ghost" ramp contact feature. Since the flat portion 222 of the ramp structure and the moveable contact surface 228 of the inertial latching element are disposed at angle a when the inertial latching element is in its latched position 230, the path for movement of the ramp contacting feature is narrowed, or restricted, and the heads are prevented from moving uncontrollably into engagement with the discs in response to applied mechanical shocks. Once again, as with the first variation, the engagement between the ramp contacting feature 130 and the inertial latching element is at an oblique angle, reducing or eliminating the possibility of "contact bounce".

Thus, the second variation of FIG. 9 can also be characterized, as was the first variation, as having a ramp contacting feature (130) which contacts and moves along a stationary surface (the ramp structure surface) as the actuator moves to and from a park position. A moveable inertial element (224) is normally biased to an unlatched position (as shown by solid lines in FIG. 9), allowing free movement of the ramp contacting feature to and from the park position. The inertial element is moveable in response to applied mechanical shocks to a latched position (as shown by dashed lines at 230 in FIG. 9). When the moveable inertial element 224 is in the latched position, the stationary surface (as represented in the figure by the flat portion 222 of the ramp structure) and a moveable surface (the moveable beveled contact surface 228 of the inertial element 224) are disposed at an angle θ, such that the stationary surface and the moveable surface form a narrowing path which prevents motion of the ramp contacting feature 130 in the critical direction.

Figure 10:
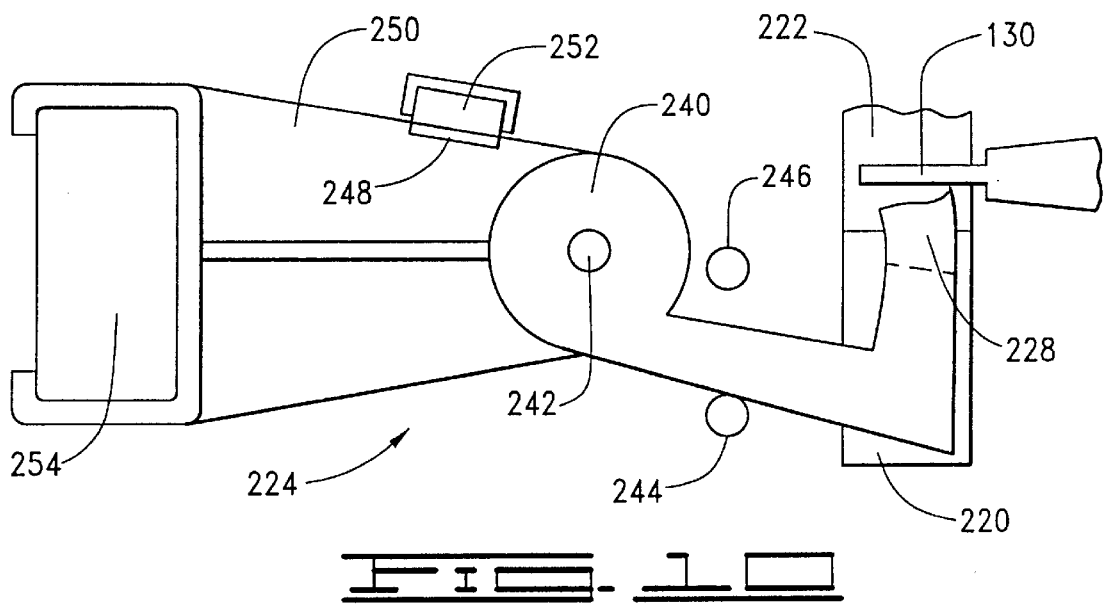
FIG. 10 is a top plan view of a third embodiment of the inertial latching system of the present invention, which operates in accordance with the variation of FIG. 9, in its quiescent, or unlatched state.
Figure 11:
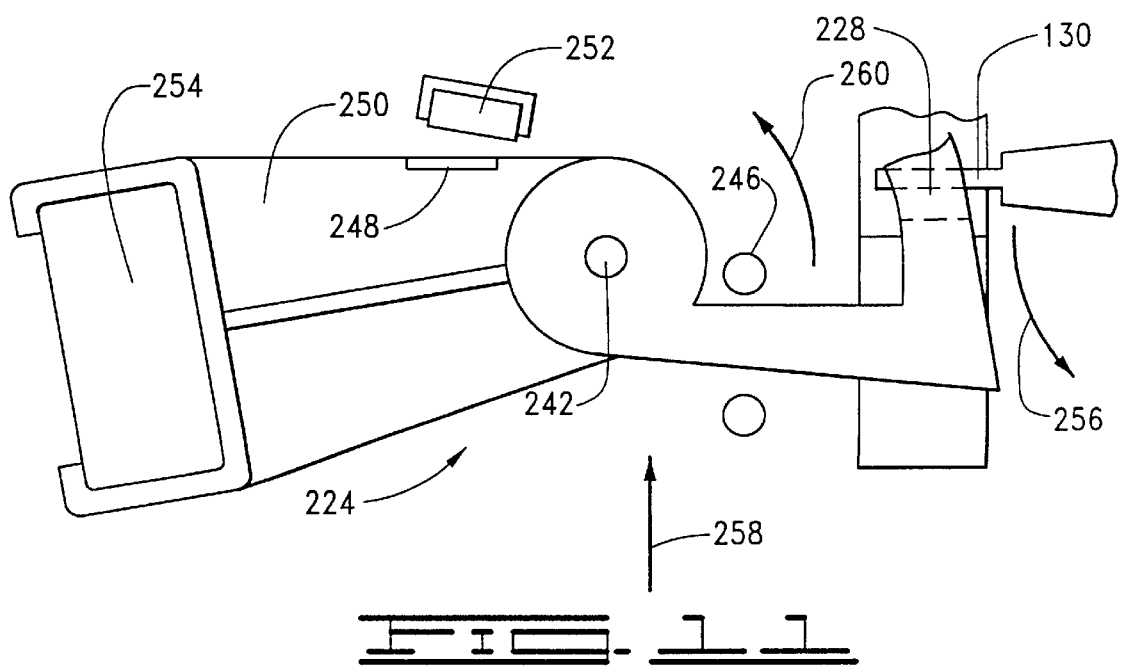
FIG. 11 is a top plan view, similar to that of FIG. 10, showing the response of the third embodiment of the inertial latching system of the present invention to applied mechanical shock.

FIGS. 10 and 11 are simplified top plan views of a third embodiment of the inertial latching system of the present invention, which is implemented in accordance with the variation of FIG. 9. Specifically, FIG. 10 shows the elements of the inertial latching system in their quiescent, or unlatched, condition, while FIG. 11 shows the response of the latching system elements to the application of a mechanical shock which tends to move the heads in a uncontrolled manner toward the discs.

FIG. 10 shows a ramp contacting feature 130 of a head suspension, similar to that designated 28 in FIG. 2, at a park position on the flat portion 222 of a ramp structure which also includes a beveled portion 220, similar to the configuration shown in FIG. 9.

An inertial latching element 224 can be seen in the figure to include a pivot body portion 240, which is rotatable about a pivot shaft 242 within a range of motion defined by unlatch and latch limit stops 244, 246, respectively. It will be apparent to one of skill in the art that the ramp structure (not separately designated) pivot shaft 242 and unlatch and latch limit stops 244, 246 will all be fixed in relationship to the housing of the disc drive.

The inertial latching element 224 is held in the unlatched position shown in FIG. 10 by a biasing arrangement comprising a magnetically permeable striker plate 248 mounted on and carried by a counterbalance arm 250, and a permanent magnet structure 252 that is fixedly mounted in relationship to the disc drive housing. One of skill in the art will appreciate that the strength of the biasing force exerted by the permanent magnet structure can be selected by determining the strength of the magnet and by controlling the position of the permanent magnet structure 252 relative to the striker plate 248. That is, for any given strength of permanent magnet, the strength of the biasing force applied to maintain the inertial latching element 224 in the unlatched position shown is inversely proportional to the proximity of the permanent magnet structure 252 to the striker plate 248 when the inertial latching element is rotated to its most clockwise position as defined by the unlatch limit stop 244. Thus, the position of the permanent magnet structure shown in FIG. 10, where the magnet comes into direct contact with the striker plate will provide the maximum biasing force for any given strength of magnet. Once again, it should be pointed out that the specific construction of the biasing system is shown as an example only, and the particular implementation of the biasing system is not considered as limiting to the scope of the invention.

FIG. 10 also shows that the counterbalance arm 250 is used to mount and support a counterweight 254. The counterbalance arm 250 and counterweight 154 serve to make the entire inertial latching element 224 unbalanced about the pivot shaft 242, and the effect of this imbalance will be discussed below.

FIG. 11 shows the response of the elements of the inertial latching system of the present invention to the application of mechanical shocks which tend to move the actuator from its intended park position toward the discs, or in the direction of arrow 256. Mechanical shocks that could result in such motion can be either torsionally applied shocks in the direction counter to arrow 256 or translational shocks applied to the disc drive in the direction of arrow 258.

The application of the just described mechanical shocks, which tend to move the actuator in the counterclockwise direction of arrow 256, will also tend to result in counterclockwise rotation of the inertial latching element 224 in the counterclockwise direction, i.e., in the direction of arrow 260, due to the unbalanced nature of the inertial element 224. If the applied mechanical shock is of sufficient magnitude to overcome the biasing force, the inertial latching element 224 will, indeed, rotate counterclockwise, with the maximum amount of such rotation defined by the latch limit stop 246. Thus when the inertial latching element 224 is in the position shown in FIG. 11, the latch is considered to be in its fully latched position. In this latch position, the beveled moveable surface 228 of the inertial latching element 224 has moved over the flat portion (222 in FIGS. 9 and 10) of the ramp structure, and provides the narrowing pathway which squeezes, or wedges, the ramp contacting feature 130, and prevents uncontrolled movement of the heads (not shown in the figure) into engagement with the discs (also not shown in the figure).

The manner in which the inertial latching system of FIGS. 10 and 11 operates can be seen in FIG. 12, which is a simplified elevation view of an inertial latching system, such as that of FIGS. 10 and 11.

FIG. 12 shows a ramp structure, generally designated at 262, which is comprised of a plurality of ramp fingers 264 supported by a common backing member 266. As shown in FIG. 12, the entire ramp structure 262 is fabricated as a single piece, since there are no biasing elements between adjacent ramp fingers 264, as was the case in the embodiments of FIGS. 5 and 6. However, once again it should be noted that the particular connecting apparatus between the ramp fingers 264 and the backing member 266 is not considered as being limiting to the scope of the invention.

Furthermore, while the example embodiment shown in FIG. 12 includes two discs 106, the present invention can be advantageously incorporated into disc drives having either a single disc or a greater number of discs than is shown in the figure, without exceeding the envisioned scope of the invention.

FIG. 12 also shows a plurality of ramp contacting features 130, each of which is associated with a head suspension (not shown) supporting a head (also not shown) for cooperation with the surfaces of the discs 106.

FIG. 12 further shows portions of a plurality of inertial latching elements 224, such as those of the embodiment of FIGS. 10 and 11. The inertial latching elements 224 are shown in solid lines at their unlatched position, and are biased to this unlatched position by a biasing system, such as those shown in FIGS. 5, 6, 7, 8, 10 and 11. With the inertial latching elements 224 in this unlatched position, it is evident in the figure that the ramp contacting features 130 are free to move up the beveled portion 220 of the ramp fingers 264, as shown at 268, to the park position on the flat portion 222 of the ramp fingers 264, as shown at 270, and then back down the ramp structure to bring the heads into cooperative engagement with the discs 106. That is, since the moveable contact surface 228 of the inertial latching elements 224 lie substantially in parallel with the beveled portion 220 in the absence of applied mechanical shocks, the stationary beveled portion 220 and moveable contact surface 228 provide a non-narrowing pathway for free, unrestricted passage of the ramp contacting features 130.

When an applied mechanical shock tends to move the ramp contacting features 130 toward the discs 106, the inertial latching elements 224 are moved to their latched position, as shown in dashed lines at 230, where the beveled moveable contact surfaces lie overlapping the flat portion 222 of the ramp fingers 264. In this relationship, the stationary flat portion 222 of the ramp fingers 264 and the moveable contact surface 228 are disposed at an angle (a in FIG. 9) and provide a narrowing pathway which prevents the passage of the ramp contacting features 130, as shown in dashed lines at 272. It is also evident that the moveable contact surface 228 of the inertial latching element 224 will form an angle with the stationary flat portion 222 of the ramp finger 264 even if it is not moved completely to the latched position 230 by the application of the mechanical shock.

Again, it should be recalled that the mass of the inertial latching elements 224 and the strength of the bias force will be selected to ensure that the inertial latching elements 224 move to their latched positions 230 before the actuator can respond to the applied mechanical shock by moving the ramp contacting feature away 130 from the park position 270 on the flat portion 222 of the ramp finger 264, and that the individual masses of each of the inertial latching elements 224 and individual biasing forces can be tuned to enable each of the inertial latching elements 224 to have a differing response range, as was discussed herein above in regard to FIG. 6.

One of skill in the art will also appreciate that the inertial latching system of the present invention can be implemented with ramp contacting features that are not associated with the head suspensions. Returning now to FIG. 1, shown is a prior art latch 274 which interacts with an actuator contact feature 276 associated with the support structure for the coil of the voice coil motor 122 to latch the actuator at a park position. Since, as previously mentioned, the prior art disc drive of FIG. 1 is a contact start/stop (CSS) type drive, the park position would be with the heads 112 closely adjacent the spindle motor 108. It is apparent that an inertial latching system such as disclosed herein can be implemented which incorporates an actuator contact feature located similarly to the actuator contact feature 276 of the prior art latching system shown in FIG. 1, and that such an inertial latching system can be positioned to provide latching with the heads 112 either at the inner diameter of the discs 108 for a CSS type drive, or with the heads unloaded onto a ramp structure, such as the prior art ramp structure of FIGS. 2 and 3. The scope of the invention, therefore, is considered to include such inertial latching systems which include actuator contact features not directly associated with the head suspensions supporting the heads.

In summary, the present invention is directed to an apparatus for latching an actuator of a disc drive at a park position in the presence of applied mechanical shocks. In accordance with preferred embodiments, an inertial latching system includes a contact feature (130) coupled to and moveable with the actuator, a stationary surface (150, 151 in FIG. 4, 146, 148, 150 in FIG. 5, 176 in FIG. 6, 150, 176 in FIG. 7, 220, 222 in FIGS. 9, 10 and 12) along and in contact with which the contact feature (130) moves to and from a park position. An inertial latching element (152 in FIG. 4, 164 in FIGS. 5 and 6, 202 in FIGS. 7 and 8, 224 in FIGS. 9 through 12) is moveable in response to applied mechanical shock from an unlatched position to a latched position, with the inertial latching element normally biased to the unlatched position. The inertial latching element includes a moveable contact surface (159 in FIG. 4, 228 in FIGS. 9 through 12) which, when the inertial latching element is in the latched position, is disposed at an angle (a in FIGS. 4 and 9) relative to the stationary surface, thus forming a narrowing path which prevents the contact feature from moving away from the park position in a critical direction. Contact between the contact feature and the stationary and moveable surfaces occurs in a manner which minimizes or eliminates contact bounce at the point of contact. The latching mechanism provides a latching force which is proportional to the magnitude of a mechanical shock applied to the disc drive. The inertial latching mechanism of the inertial latch of the invention can be optimized to respond to various ranges of applied mechanical shock. For purposes of the appended claims, the recited "means for latching" will be understood consistent with the foregoing discussion to correspond to the structure of the disclosed material latching systems of FIGS. 4–12 discussed above, and will not be extended to cover the prior art of FIGS. 1–3. Moreover, non-inertial latching systems, including the detent system of FIGS. 1–3 are expressly excluded as nonequivalents to the structure of FIGS. 4–12.

From the foregoing, it is apparent that the present invention is particularly well suited and well adapted to achieve the functionality set forth herein above, as well as possessing other advantages inherent therein. While particular configurations of the present invention has been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. An inertial latching system for a disc drive having a moveable actuator supporting a head adjacent a rotatable disc, comprising:
   a contact feature coupled to and moveable with the actuator;
   a stationary surface which the contact feature contacts and moves along as the actuator is moved to and from a park position; and an inertial latching element which moves from an unlatched position to a latched position in response to application of a mechanical shock to the disc drive, the inertial latching element comprising a moveable surface which is disposed at an angle with respect to the stationary surface, wherein the stationary surface and the moveable surface form a narrowing path which prevents movement of the contact feature along the stationary surface during duration of the applied mechanical shock.

2. The inertial latching system of claim 1, wherein the contact feature is a part of a head suspension supporting the head, the stationary surface is a part of a ramp structure fixedly positioned closely adjacent an outermost diameter of the disc, and the park position is a location of the contact feature on the stationary surface.

3. The inertial latching system of claim 1, wherein the contact feature is associated with a portion of the moveable actuator separated from the head, and the stationary surface is a part of a ramp structure fixedly positioned closely adjacent said separate portion of said moveable actuator.

4. The inertial latching system of claim 1, further comprising a biasing system which provides a biasing force for encouraging the inertial latching element to the unlatched position in the absence of applied mechanical shock.

5. The inertial latching system of claim 4, wherein the inertial latching element has a selected mass, and wherein the biasing force and the selected mass determine a response characteristic of the inertial element to the application of mechanical shock.

6. The inertial latching system of claim 5, wherein the contact feature, stationary surface, inertial latching element, moveable surface, biasing system, biasing force, selected mass and response characteristic are characterized, respectively, as a first contact feature, a first stationary surface, a first inertial latching element, a first moveable surface, a first biasing system, a first biasing force, a first selected mass and a first response characteristic, and wherein the inertial latching system comprises a second contact feature, a second stationary surface, a second inertial element comprising a second moveable surface and having a second selected mass, a second biasing system providing a second biasing force to the second inertial element, and wherein the second biasing force and the second selected mass provide the second inertial latching element with a second response characteristic different from the first response characteristic.

7. A disc drive, comprising:
an actuator supporting a head for cooperative engagement with a rotating disc, and
an inertial latching system comprising:
a contact feature coupled to and moveable with the actuator;
a stationary surface which the contact feature contacts and moves along as the actuator is moved to and from a park position; and
an inertial latching element which moves from an unlatched position to a latched position in response to application of a mechanical shock to the disc drive, the inertial latching element comprising a moveable surface which is disposed at an angle with respect to the stationary surface when the inertial latching element is in the latched position, whereby the stationary surface and the moveable surface form a narrowing path which prevents movement of the contact feature along the stationary surface during duration of the applied mechanical shock.

8. The disc drive of claim 7, wherein the contact feature is a part of a head suspension supporting the head, the stationary surface is a part of a ramp structure fixedly positioned closely adjacent an outermost diameter of the disc, and the park position is a location of the contact feature on the stationary surface wherein the head is operatively disengaged from the disc.

9. The disc drive of claim 7, wherein the contact feature is associated with a portion of the moveable actuator separated from the head, and the stationary surface is a part of a ramp structure fixedly positioned closely adjacent said separate portion of said moveable actuator.

10. The disc drive of claim 7, further comprising a biasing system which provides a biasing force for encouraging the inertial latching element to the unlatched position in the absence of applied mechanical shock.

11. The disc drive of claim 10, wherein the inertial latching element has a selected mass, and wherein the biasing force and the selected mass determine a response characteristic of the inertial element to the application of mechanical shock.

12. The disc drive of claim 11, wherein the contact feature, stationary surface, inertial latching element, moveable surface, biasing system, biasing force, selected mass and response characteristic are characterized, respectively, as a first contact feature, a first stationary surface, a first inertial latching element, a first moveable surface, a first biasing system, a first biasing force, a first selected mass and a first response characteristic, and wherein the inertial latching system comprises a second contact feature, a second stationary surface, a second inertial element comprising a second moveable surface and having a second selected mass, a second biasing system providing a second biasing force to the second inertial element, and wherein the second biasing force and the second selected mass provide the second inertial latching element with a second response characteristic different from the first response characteristic.

13. A disc drive, comprising:
an actuator supporting a head for cooperative engagement with a rotating disc, the actuator including a contact feature; and
means for latching the actuator at a park position in the presence of an applied mechanical shock by forming a narrowing path which prevents the contact feature from moving away from the park position.

* * * * *